United States Patent [19]

Connolly

[11] 4,422,937
[45] Dec. 27, 1983

[54] STATIC SCREEN

[76] Inventor: James D. Connolly, P.O. Box 1238, Princeton, W. Va. 24740

[21] Appl. No.: 130,461

[22] Filed: Mar. 14, 1980

[51] Int. Cl.³ ............................................. B01D 39/10
[52] U.S. Cl. .................................... 210/409; 209/264; 209/281; 209/393; 210/433.1; 210/456
[58] Field of Search ................ 209/264, 281, 393–396; 210/409, 433 R, 456, 499

[56] References Cited

U.S. PATENT DOCUMENTS

| | | | |
|---|---|---|---|
| 1,942,948 | 1/1934 | Booth | 209/393 |
| 2,208,448 | 7/1940 | Bixby | 209/393 |
| 2,699,933 | 1/1955 | Siefert, Sr. | 210/499 X |
| 2,872,041 | 2/1959 | Fontein et al. | 209/393 X |
| 2,942,730 | 6/1960 | Fontein | 209/393 X |
| 3,451,555 | 6/1969 | Ginaven | 210/499 X |
| 3,815,740 | 6/1974 | Ginaven | 209/264 |
| 3,993,567 | 11/1976 | Ginaven | 209/393 X |
| 4,113,626 | 9/1978 | Detcher | 210/456 X |

Primary Examiner—Robert H. Spitzer
Attorney, Agent, or Firm—Wilmer Mechlin

[57] ABSTRACT

A reversible static screen for classifying and dewatering flowing slurries, the screen being inclined and having a flow or screening surface formed by laterally spaced screen wires disposed normal to the flow direction of the slurry and so spaced that the openings therebetween are narrower over the end portions than over the intermediate portion of the screen.

8 Claims, 5 Drawing Figures

STATIC SCREEN

BACKGROUND OF THE INVENTION

Screening apparatus in which slurries are flowed by gravity over surfaces of inclined static or stationary flat or concavely curved, so-called "sieve bend" screens, are widely used in industry for both dewatering and classifying or particle separating, with the usual preference, for minimizing blinding, a screen having a flow surface formed by bases of laterally spaced, inverted triangular or wedge-shaped screen rods or wires disposed across or perpendicular to the flow. While recognizing in particle separation that the size of the particles passed by slots of a given width between the screen rods will vary inversely with the inclination or slope of the screen, in designing such screens the customary practice is to space the screen rods uniformly over the length of the screen.

An exception to the above practice is disclosed in Detcher U.S. Pat. No. 4,113,626, in which the screens are semi-parabolic and fabricated by securing the transverse screen rods to initially straight or flat, longitudinally extending support or tie rods and then bending the assembly longitudinally of the support rods to the desired parabolic shape. The result is a screen in which the spacing between the screen rods varies over the length of the screen with the spacing at minimum over the end area of minimum radius and increasing with increase in radius toward the parabolically shaped screen's opposite end. According to Detcher, his screens are reversible and purportedly effective in dewatering regardless of whether the end of minimum or maximum radius is the leading end but the patent is silent as to the effect of the variation in slot width on particle separation and only mentions that the slots ordinarily will be of the order of 0.005 to 0.040 inches (0.127 to 1.016 mm.) wide. It is to a static screen of the spaced transverse screen rod type of improved efficiency in particle separation that the present invention is particularly directed.

SUMMARY OF THE INVENTION

The primary object of the present invention is to provide an improved reversible static screen for screening apparatus for classifying or separating by size particles of a flowing mixture, wherein the flow surface of the screen is formed by spaced transverse screen rods disposed normal to the flow of the mixture, the openings between which are narrower over the end portions than the intermediate portion of the screen.

Another object of the invention is to provide an improved reversible screen for a static sieve for classifying and dewatering a flowing slurry, wherein the spacing of the transverse screen rods forming the screen's flow surface is non-uniform over the length of the screen and counterpart over the end portions and at maximum over the midportion of the screen.

A further object of the invention is to provide an improved static screen for classifying and dewatering a flowing slurry, wherein the screen has an arcuately concave flow surface formed by spaced transverse screen rods and the spacing between the rods is at maximum at the screen's vertical center and progressively reduced toward its lower or trailing end such that the effective openings between the screen rods are of uniform width from the center to the screen's trailing end for thereby controlling the maximum size of the particles passed through the screen.

An additional object of the invention is to provide an improved reversible static screen for classifying and dewatering a flowing slurry, wherein the flow surface of the screen is formed by spaced transverse screen rods and, whether the surface is concave or flat, the spacings between the screen rods over the end portions of the screen are counterpart and so reduced relative to the spacing between the rods over the screen's intermediate portion as to compensate for feeding of the slurry at an impact angle onto the screen surface.

Other objects and advantages of the invention will appear hereinafter in the detailed description, be particularly pointed out in the appended claims, and be illustrated in the accompanying drawings, in which:

FIGURE DESCRIPTION

DETAILED DESCRIPTION

Figure 5:
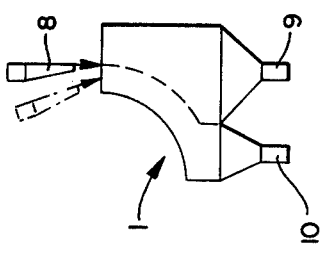
FIG. 5 is a much enlarged fragmentary side elevational view showing the relation of the actual and effective openings between an adjoining pair of screen rods.

Referring now in detail to the drawings in which like reference characters designate like parts, the improved screen of the present invention is designed for use as a static screen in screening apparatus for separating by size solid particles of a mixture flowing along the screen. Positioned stationarily at a slope or inclination inducing gravity flow of the mixture therealong, the improved screen is particularly adapted for particle separation or classifying and also dewatering or deliquefying slurries or liquid-solid mixtures in which solid particles are suspended in a liquid carrier, such as water.

Figure 1:
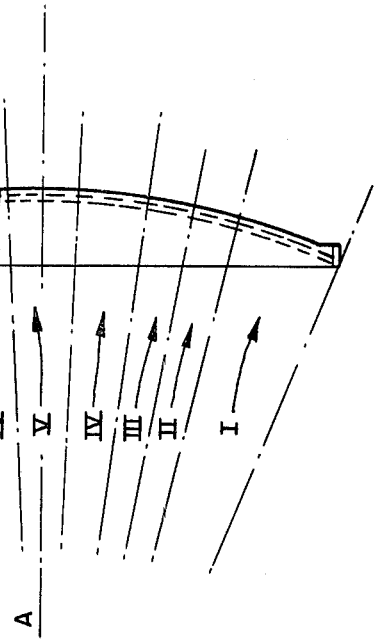
FIG. 1 is a somewhat schematic side elevational view of screening apparatus incorporating a preferred embodiment of the improved static screen of the present invention.

Conveniently a removably mounted part of screening apparatus 1 illustrated schematically in FIG. 1, the improved static screen of the present invention, designated as 2, to avoid the tendency of stationary mesh screens to blind over or clog, has a screen or flow surface or deck 3 formed by laterally spaced, parallel transverse screen wires, rods or bars 4 attached as by welding to and supported and connected by transversely spaced, suitably parallel longitudinal support rods or bars 5. The screen 2 may be bounded by framing 6 and usually will have side boards 7 for laterally containing the slurry applied thereto. In turn, the screening apparatus 1 will include a head box, nozzles or other suitable means 8 for feeding the slurry or other mixture to be screened to the screen 2 and separate outlets, one, 9, for discharging undersize particles and liquid passed through the screen and the other, 10, for discharging the residue flowing off the screen surface 3.

In a screening operation, the screen 2 is positioned with the transverse screen wires 4 normal or perpendicular and the support rods 5 parallel to the flow direction of the slurry or liquid-solid mixture so that the slurry flows across the screen wires. Suitably triangular or wedge-shaped with their bases 11 and the transverse slots or openings 12 therebetween forming the slot-interrupted flow surface 3, the screen wires 4, by the abrading action of the particles in the flowing slurry, will have their leading edges progressively worn down and trailing edges sharpened with consequent reduction in the screen's efficiency, unless, as intended, the improved screen 2 is reversible end for end for periodically transposing or interchanging the leading and trailing edges of the screen wires so that the latter will present relatively sharp leading edges to the slurry over the effective life of the screen. Not only are the preferred screens 2 reversible, but, contrary to the semiparabolic screens of the Detcher patent, they are so designed that their action in classifying and dewatering the slurry is the same, whichever end is the leading end.

As do the screens of the Detcher patent, the screens 2 of the present invention differ from conventional static screens of the transverse screen rod type in the non-uniformity of the width of the slots 12 between the screen rods 4 over the length of the screen. However, as opposed to Detcher, in the screen 2 not only are there narrower slots in each end portion than in the midportion of the screen but the halves or parts of the screen about or on opposite sides of its horizontal or transverse bisecting or center- or midline, indicated in dot-and-dash as A—A, are identical or counterpart.

Depending on the initial consistency of the slurry to be particle separated or classified, the slope of the screen 2 relative to the horizontal may range from as little as 15° to as much as 75°, but usually will be at or about 60° and in any case for a given slurry will be sufficient to cause the slurry to flow or slide by gravity down the flow surface 3 without overflowing or losing contact with that surface. By contrast with a horizontal vibrating screen, the maximum size of the particles separated by a static sloping screen of the transverse screen rod type, will be less than the actual width of the slots 7 between the screen rods 4. Thus, with the slurry flowing along or parallel to the screen surface 3 and the force drawing or pulling undersize particles through openings in the screen the vertical force of gravity, the relation between the width of each slot or actual screen opening 12 and the maximum size of the particles passed through the slot will be defined or determined by the equation $c = (b/\cos \theta)$, in which, as shown for an exemplary opening in FIG. 5, "c," the actual opening, is the hypotenuse of a right triangle lying along a tangent to the screen surface at the point of the opening, "b," the effective opening, and "a" are respectively the horizontal and vertical legs of that triangle, and "$\theta$" is the angle of the tangent or hypotenuse, relative to the horizontal.

If, as in the preferred embodiment, the surface 3 of the screen 2 is cylindrically concave, for a surface of a given radius and slope, the above equation enables the actual widths of the slots 12 at the center and over the lower half of the screen surface to be predetermined, such that the slots not only progressively reduce in width from the center to the lower end but are uniform, equal or the same in their effective openings and correspondingly uniform in the maximum size of the particles that can be passed or separated by them. By duplicating over the other half the progressive reduction so predetermined in the widths of the slots 12 from the center toward the opposite end of the screen, the maximum size of the particles separated from the slurry by the screen will be the same, regardless of which half is the lower. Too, since the angles relative to the horizontal of the tangents to the concavely curved screen surface 3 progressively increase over the upper half of the screen toward its leading end, the effective openings through the slots 12 in the upper half are correspondingly reduced relative to their actual openings, so that the upper half, while effective in dewatering, can only pass particles smaller than those passable by the lower half, consequently enabling the slurry to be applied or introduced to or impacted against the upper part of the screen without affecting the accuracy of the particle size separation of which the screen is capable.

Knowing the desired radius and slope of the screen and the desired particle size saparation, it is thus possible to fix or predetermine the lateral spacings at which the screen rods 3 should be attached to the support rods 4 and it makes no significant difference whether the support rods are bent to the desired curvature before or after the screen rods are attached thereto. Also, if excessive wear in use over the center or other area of the screen will present a problem, a ready solution is to use thicker screen rods in that area while retaining the predetermined spacings between them.

Figure 3:
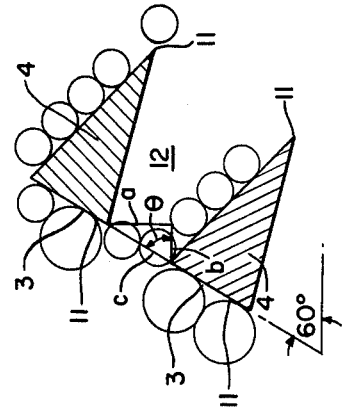
FIG. 3 is a vertical sectional view taken along lines 3—3 of FIG. 2.
Figure 4:
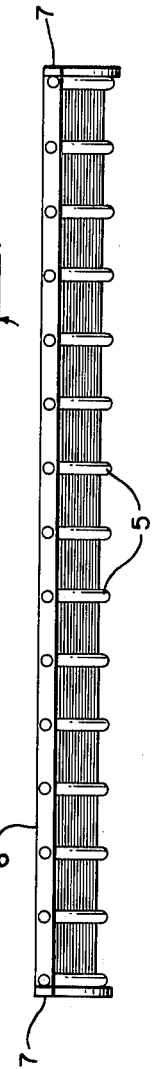
FIG. 4 is an end elevational view of the screen of FIG. 2.
Figure 2:
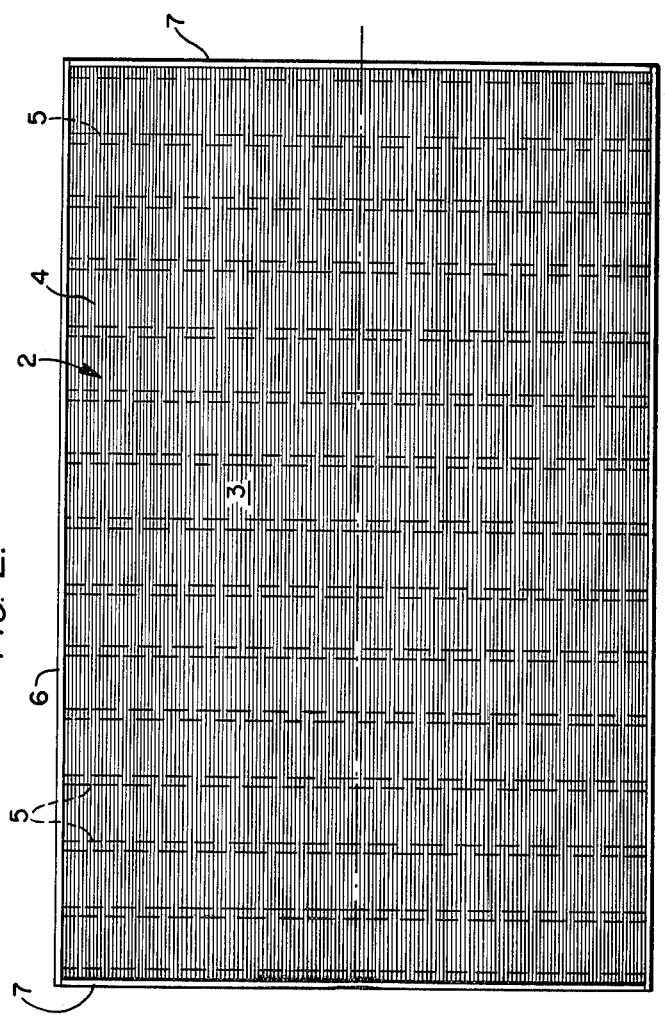
FIG. 2 is a front elevational view on an enlarged scale of the improved screen.

Rather than progressively reducing slot-by-slot the widths of the slots 12 between the screen rods 3 from the center- or midline A—A to each end of the screen 2, its fabrication can be simplified, without substantially reducing the accuracy and efficiency of the particle size separation, by subdividing the screen surface 3 by radii or, more precisely, radial planes, into zones within each of which the slots or actual openings 12 between the screen rods 4 are equal, so long as each zone is limited to an arc in which there is only a slight or small difference in the effective openings of its slots. As an example of such a radially zoned screen, FIG. 3 illustrates zoning for a screen having a radius of 40 inches (101.6 cm.), a finished width of 35⅝ inches (90.5 cm.), and, as indicated in FIG. 1, a slope of 60°, for separating from a slurry solid particles up to 0.016 inches (0.41 mm.) in size. Divided into a central zone and four zones in each half, each the duplicate of the corresponding zone in the other half, the widths of the actual openings 12 in each of several zones designated by Roman numerals, suitably may be as follows:

| Zone I | .019 inches (0.48 mm.) |
| Zone II | .022 inches (0.56 mm.) |
| Zone III | .026 inches (0.66 mm.) |
| Zone IV | .029 inches (0.74 mm.) |
| Zone V | .032 inches (0.81 mm.) |

If, as indicated by the relative disposition of the feeding means 8 of the screening apparatus and its direction arrow shown in solid line in FIG. 1, the slurry is fed, introduced or applied to the screen 2 parallel to the flow surface 3, and the screen is of the sloping transverse screen rod type, the relation of the actual to the effective openings between the screen rods 4 will be defined by or conform to the equation $c = (b/\cos \theta)$, whether the screen surface is flat or curved. However, if, instead, as indicated by the feeding means and direction arrow shown in the dotted line in the same figure, the feed to the upper part of the screen is at an angle to the flow surface, another factor is introduced, since the effective opening for a given actual opening increases directly with increase in the angle of impact of the slurry, up to an impact angle of 90° obtainable by back feeding, at which the effective and actual openings are substantially equal. Applied to a screen having a flat flow surface in which, as conventionally and suited for a parallel feed of the slurry, the screen rods are uniformly spaced over the length of the screen, feeding of the slurry at an angle to the screen surface will increase over the area of impact the size of the particles passable by the screen. It is in such case that the reversible screen of the present invention, even though having a flat instead of the preferred concavely curved flow surface 3, has advantage in reducing the width of the screen openings 12 toward each end of the screen and so compensating for the increase in the effective openings otherwise occasioned by the angular impact of the slurry on the screen.

From the above detailed description it will be apparent that there has been provided an improved screen of the transverse screen bar type in which the actual openings between the screen rods not only are varied or non-uniform over the length of the screen but are so predetermined relative to the effective openings as to increase the efficiency and accuracy of the screen in particle size separation. It should be understood that the described and disclosed embodiment is merely exemplary of the invention and that all modifications are intended to be included that do not depart from the spirit of the invention and the scope of the appended claims.

Having now described my invention, I claim:

1. In screening apparatus for separating by size particles of a slurry fed thereto, the improvement comprising a reversible static screen in operative position removably mounted at a predetermined slope in the apparatus, said screen having longitudinally spaced ends and transversely spaced sides and presenting to the slurry for flow longitudinally therealong a longitudinally arcuately concave sloping flow surface formed by laterally spaced parallel screen rods extending transversely of said screen normal to the flow direction of the slurry, said screen being bisected longitudinally by a transverse centerline thereof into counterpart halves each having in an end portion openings between screen rods of reduced width longitudinally of said screen relative to openings between screen rods in a center part of said screen longitudinally intermediate said end portions, the actual openings between the screen rods reducing progressively in width from the transverse centerline toward each end of the screen, and the effective width of the openings determinative of the maximum size of particles passable therethrough being substantially uniform from the centerline to whichever end is then the trailing end of the screen.

2. A reversible static screen according to claim 1, wherein the flow surface is longitudinally cylindrically concave and the actual widths of the openings between the screen rods over each of the counterpart halves of screen are predetermined by applying to a then lower of said halves the equation $c=(b/\cos\theta)$ in which c is the actual width of an opening, b the effective width of that opening at any point in the lower half and $\theta$ the angle relative to the horizontal of the tangent to the flow surface at said point.

3. A reversible static screen according to claim 2, wherein the screen surface is divided radially into arcuate zones within each of which the openings between the screen rods are the same in actual width and of relatively small difference in effective width.

4. A reversible static screen according to claim 1, wherein the screening apparatus includes means for feeding the slurry to the screen parallel to the flow surface thereof.

5. A reversible static screen according to claim 1, wherein the screening apparatus includes means for feeding the slurry to the screen at an angle to the flow surface thereof.

6. In screening apparatus for separating by size particles of a slurry fed thereto, the improvement comprising a reversible static screen in operative position removably mounted at a predetermined slope in the apparatus, said screen having longitudinally spaced ends and transversely spaced sides and presenting to the slurry for flow longitudinally therealong a substantially flat sloping flow surface formed by laterally spaced parallel screen rods extending transversely of said screen normal to the flow direction of the slurry, said screen being bisected longitudinally by a transverse centerline thereof into counterpart halves each having in an end portion openings between screen rods of reduced width longitudinally of said screen relative to openings between screen rods in a center part of said screen longitudinally intermediate said end portions, and means for feeding the slurry to an upper end portion of the flow surface of the screen at an angle relative thereto within the range of 0° to 90°.

7. A reversible static screen according to claim 6, wherein the openings between the screen rods in the part of the screen intermediate the end portions thereof are substantially uniform in actual width.

8. In screening apparatus for separating by size solid particles of and deliquefying a flowing slurry fed thereto, the improvement comprising a static screen having longitudinally spaced ends and transversely spaced sides and presenting for flow of the slurry longitudinally therealong a longitudinally sloping arcuately concave opening-interrupted flow surface formed by laterally spaced parallel screen rods extending transversely of the screen normal to the flow direction of the slurry, said openings between said screen rods over a lower part of said flow surface being varied in actual width and substantially uniform in effective width for thereby controlling the maximum size of the particles separable from the slurry by said screen.

* * * * *